No. 744,346. PATENTED NOV. 17, 1903.
W. H. HULTGREN.
ELEVATOR.
APPLICATION FILED MAR. 25, 1903.
NO MODEL. 3 SHEETS—SHEET 1.

No. 744,346. PATENTED NOV. 17, 1903.
W. H. HULTGREN.
ELEVATOR.
APPLICATION FILED MAR. 25, 1903.
NO MODEL. 3 SHEETS—SHEET 2.

No. 744,346. PATENTED NOV. 17, 1903.
W. H. HULTGREN.
ELEVATOR.
APPLICATION FILED MAR. 25, 1903.
NO MODEL. 3 SHEETS—SHEET 3.

Witnesses:
Louis D. Heinrichs
R. M. Kelly

Inventor.
Wm. H. Hultgren
By his atty

No. 744,346.

Patented November 17, 1903.

UNITED STATES PATENT OFFICE.

WILLIAM H. HULTGREN, OF PHILADELPHIA, PENNSYLVANIA, ASSIGNOR TO THE OTIS ELEVATOR COMPANY, A CORPORATION OF NEW JERSEY.

ELEVATOR.

SPECIFICATION forming part of Letters Patent No. 744,346, dated November 17, 1903.

Application filed March 25, 1903. Serial No. 149,421. (No model.)

*To all whom it may concern:*

Be it known that I, WILLIAM H. HULTGREN, of the city and county of Philadelphia, State of Pennsylvania, have invented an Improvement in Elevators, of which the following is a specification.

My invention has reference to elevators; and it consists of certain improvements, which are fully set forth in the following specification and shown in the accompanying drawings, which form a part thereof.

The object of my invention is to provide means for operating the cable-winding drum which shall embody accurate and positive belt-shifting devices, brake devices, and adjustments for the worm-gearing to compensate for wear.

My object is also to provide a simple and efficient manner of attaching the control-cable to the flier-sheave whereby it is not liable to be cut.

In carrying out my invention I combine the belt-shifters with independent levers, which are both locked when the elevator-drum is at rest and one only locked against movement when the drum is in operation, and a fliersheave for the control-cable provided with the locking means and also actuating means for shifting the levers independently.

My invention also includes other features of construction, which, together with those above mentioned, will be better understood by reference to the drawings, in which—

Figure 1:
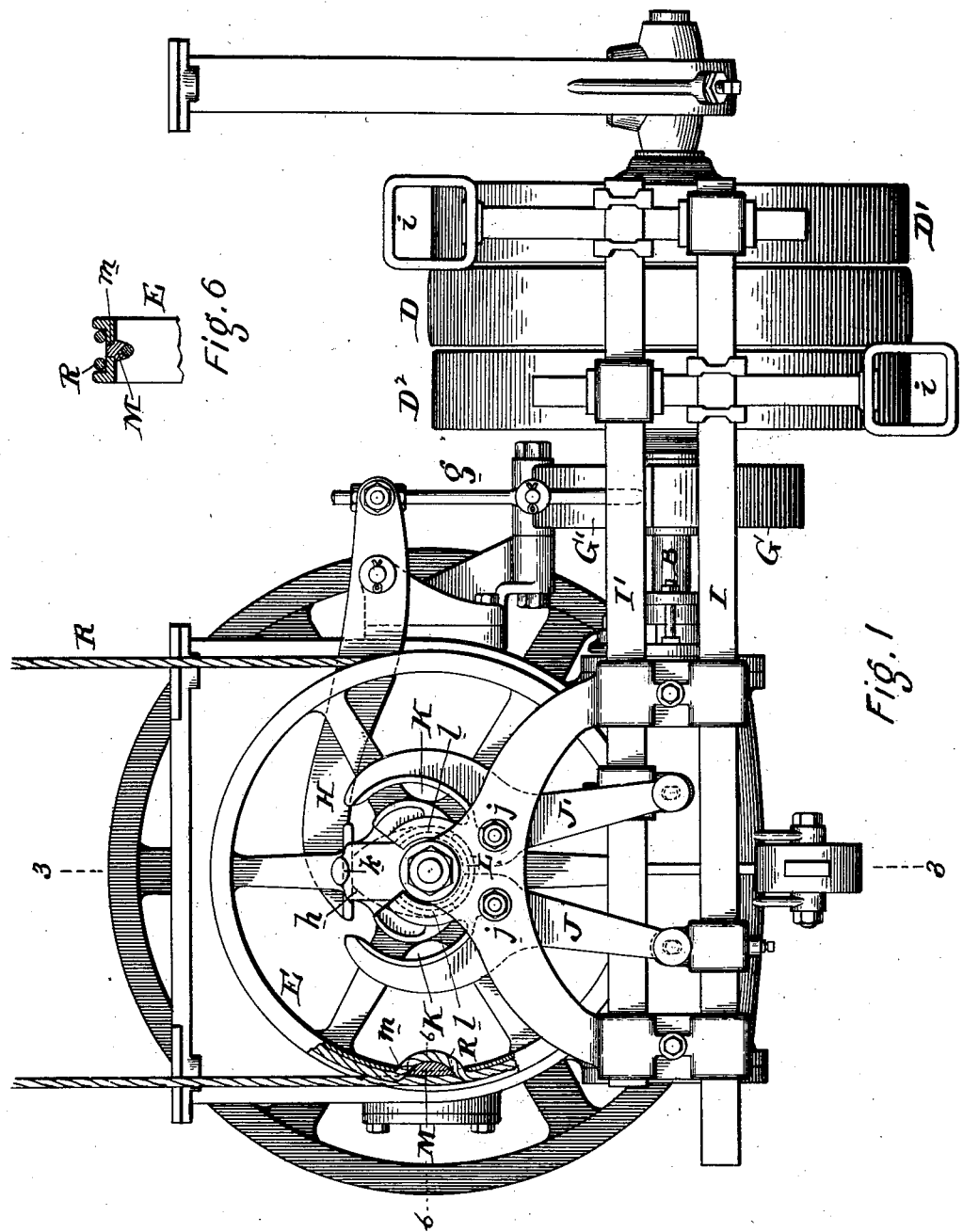
Figure 2:
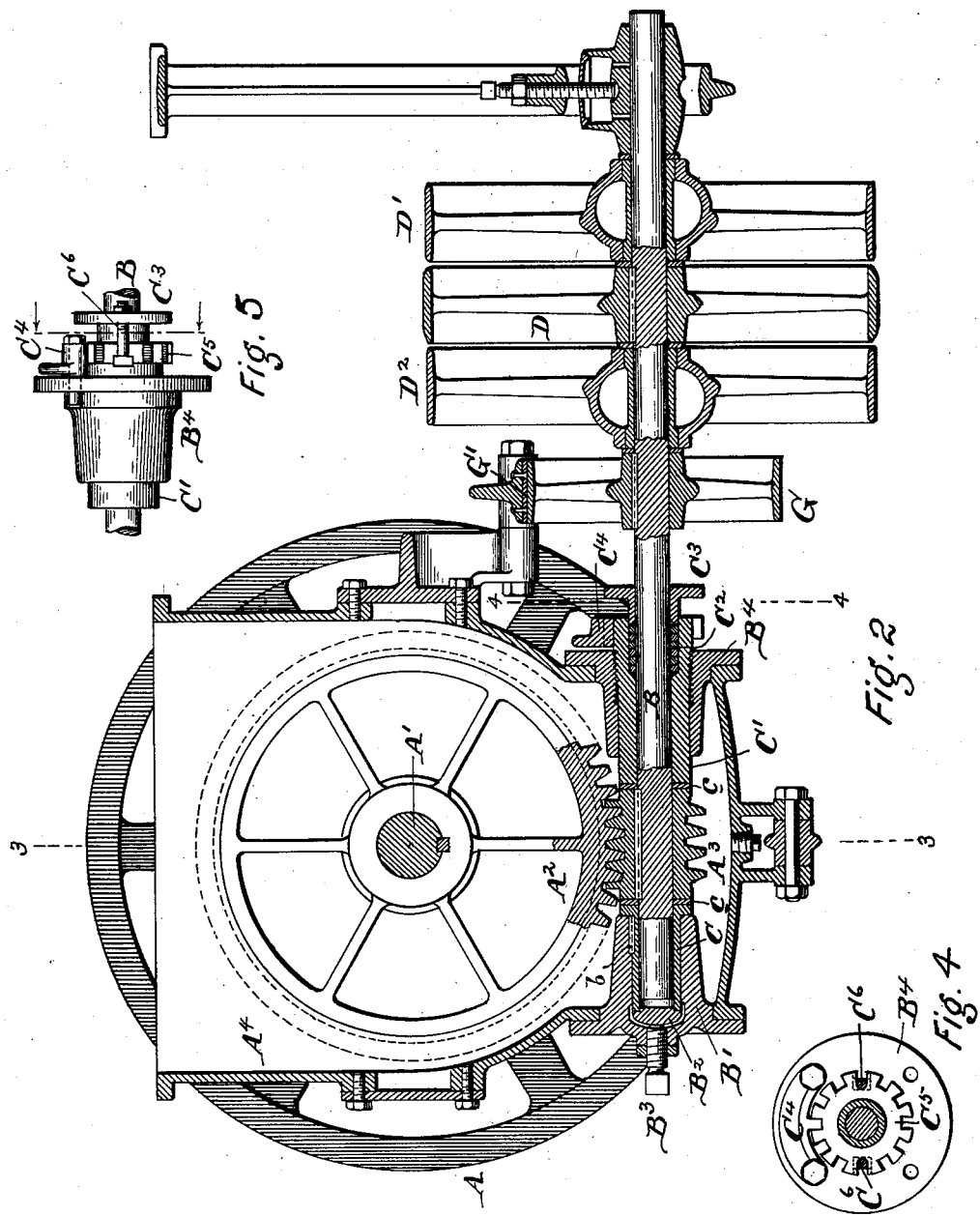
Figure 3:
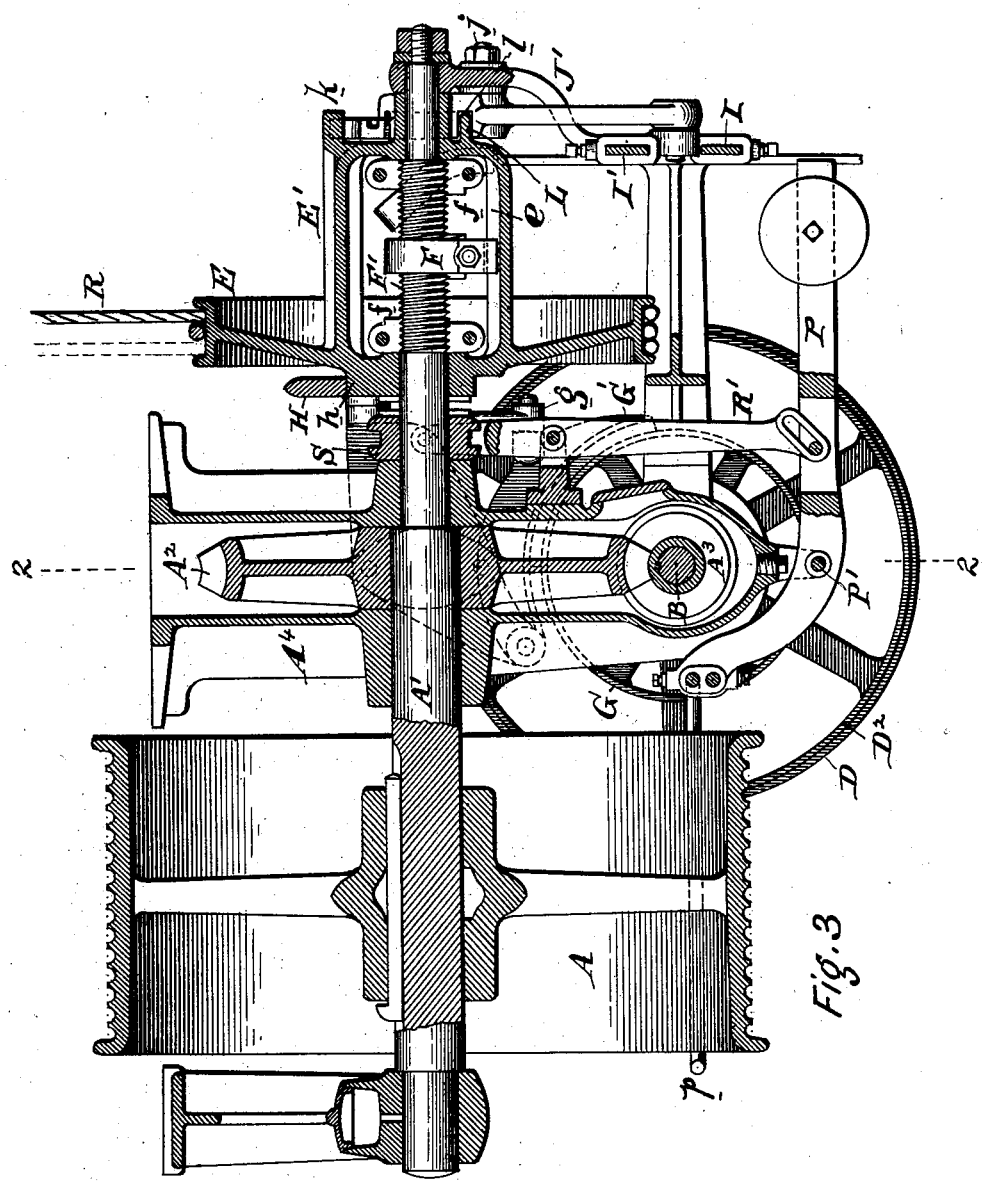

Figure 1 is a side elevation of the devices of an elevator embodying my invention. Fig. 2 is a section of the same on line 2 2 of Fig. 3. Fig. 3 is a section of the same on line 3 3 of Fig. 1. Fig. 4 is a cross-section of a portion of the same on line 4 4 of Fig. 2. Fig. 5 is an elevation of a portion of the adjusting devices for the worm-shaft, and Fig. 6 is a cross-section on line 6 6 of Fig. 1.

A is a winding-drum and is driven by a shaft A'. Secured to the shaft A' is a worm-wheel $A^2$, which is driven by a worm $A^3$, secured to the worm-shaft B. The worm-wheel and worm are inclosed within a casing $A^4$. The worm-shaft B is driven by a pulley D and has loosely journaled upon it the pulleys D' $D^2$ for normally supporting the driving-belts when not on the pulley D, as is well known in elevators of this type.

G is a brake-pulley acted upon by a brake-shoe G'.

The end of the worm-shaft B is journaled in a bushing C, adjustable longitudinally by a screw $B^3$, carried in the head B', secured to the casing $A^4$. A spline or key $b$ between the bushing C and head B' prevents the bushing from rotating. A cap $B^2$ fits the end of the bushing and enables the screw $B^3$ to act centrally upon said bushing for its adjustment. The bushing is preferably flanged, and between its flanged end and the worm I arrange an antifriction-collar $c$ to take the thrust and reduce the wear. The other end of the shaft B is journaled in an adjustable sleeve C', which is directly screwed into a head $B^4$, secured to the casing $A^4$. A collar $c$ is also interposed between the end of the sleeve C' and the worm to reduce friction and wear. The sleeve C' has its outer end extended beyond the head $B^4$ and is provided with a notched flange $C^5$, which is locked in position when properly adjusted by a locking-plate $C^4$, which is bolted in position when the adjustment is made. The end of the sleeve C' is further provided with a stuffing-box containing the packing $C^2$ and a gland $C^3$, which latter is held in place by the bolts $C^6$, passing through the gland and carried by the notched flange of the sleeve C', as shown in Figs. 1, 4, and 5. By these adjustable parts the worm $A^3$ can be adjusted longitudinally, so as to be accurately centered relatively to the axis of the worm-wheel $A^2$. While this adjustment is not necessary with ordinary worm and worm-wheel construction, it is a feature of very great importance in the use of that type of worm known as the "Hindley" worm, in which the teeth fit closely to the teeth of the worm-wheel throughout the entire length of the worm.

I I' are the belt-shifter bars and carry on their ends the belt-guides $i$ and are adapted to shift the belts from the loose pulleys D' $D^2$ to the fast pulley D, or vice versa. These bars are suitably guided and are respectively moved by levers J J', pivoted to the main frame at $j$. The free or upper ends of these levers are formed with cam-grooves K and locking-grooves *l*, the lattter being concentric with the shaft A' when the belt-shifters are in the position shown in Fig. 1.

E is the flier-sheave and is journaled loosely upon the drum-shaft A'. It is adapted to be rotated in either direction by the control-cable R, which is wound about its periphery several times and attached thereto at one place. Heretofore it has been customary to secure this cable to the periphery by a clamping-hook bolt, but this was undesirable, owing to the fact that the bolt caused the outside cable portions to cut in winding and unwinding upon the sheave. To obviate this, I provide the periphery of the flier-sheave with an aperture *m*, centrally disposed, into which is fitted a plug M, having a curved inner surface and around which the cable is caused to pass, as indicated in Figs. 1 and 6. The plug M is formed with lateral flanges or shoulders, which prevent it passing through the aperture in the sheave, and consequently a bend or bight is given to the cable, which securely adjusts it to the sheave and prevents any longitudinal slippage thereof. It will also be seen that by this construction there are no projections to rub against the cable R in winding and unwinding upon the sheave, this feature being very clearly indicated in Fig. 6.

The braking devices for arresting the rotation of the worm-shaft B consist of the following: G is a brake-wheel connected to the worm-shaft. G' is a brake-shoe pivoted to the main frame of the machine and adapted to create a friction upon the surface of the brake-wheel. *g* is a link connecting the brake-shoe with the free arm of a lever H. The free end of the lever H extends from a cam *h* on the hub of the flier-sheave E, as shown in Figs. 1 and 3. In the position shown in these figures the free end of the lever H is raised by the cam and the brake-shoe is pressed upon the brake-wheel. At this time it is also seen that the belts will be guided by the shifters upon the idler-pulleys $D'$ $D^2$. If the flier-sheave is rotated in the direction of the hands of a watch, Fig. 1, the brake will be removed and the lever J' will be unlocked and operate to shift the belt from the pulley D' to the driving-pulley D. If the flier-sheave is rotated in the opposite direction, then the lever J' is locked and the lever J is operated to shift the belt from the pulley $D^2$ to the driving-pulley D. This operation causes the machine to rotate in a direction either to raise or lower the cage by reason of one belt running straight and the other belt being crossed.

S is a clutch which is carried upon the drum-shaft A' and adapted to rotate with it. In the position shown in Fig. 3 this clutch is out of contact with the clutch on the hub of the flier-sheave E, and it is kept in this position by the lever R and the weighted lever P, which is pivoted at P' to the main frame of the machine. This lever P is provided with arms *p*, located under the winding-drum, which are operated upon by the cables in case the same should become slack or break. A downward movement of the arms *p*, induced by the weight of the slack cables resting upon same, will cause a shifting of the lever R and a connection between the clutch S and the flier-sheave. The result of this is that the flier-sheave will be rotated and the belt shifted to stop the machine and the brake applied to bring it at rest in a neutral position.

It is also evident from the construction of the mechanism constituting the slack-cable stop that it is automatic in its action and will replace itself in its normal position after the cables have been replaced upon the winding-drum. This will readily be understood by referring to Fig. 3, in which lever P is provided with a weight $P^4$, which can be adjusted with regard to its relative position from the fulcrum P', so as to secure the necessary overbalance of the arms P and to hold the clutch S in normal position, as shown, by means of a lever R'. This lever R' is provided with a cam-slot $P^3$, in which a pin is made to operate and by which the weighted lever P is also held normally in suspension. It is obvious from this that when the slack in the cables resting upon arms P overbalance the weight $P^4$ on the lever P this lever will oscillate about its fulcrum P' and cause the pin $P^2$, operating in the cam-slot $P^3$, to move the lever R', so as to throw the clutch S into action, thereby rotating the flier-sheave to shift the belts off from the tight pulley on the worm-shaft and to apply the brake, stopping the machine. When the cables are replaced upon the winding-drum, the clutch is disengaged and the levers and arms return automatically to their normal position.

F is the usual traveling nut carried upon the threaded part F' of the drum-shaft A', said nut having a sliding connection with the guides *e* of the flier-sheave part E'. Adjustable nuts *f f* are clamped upon the part F' of shaft A' at a distance sufficient from the traveling nut F to give the desired number of rotations of the winding-drum. At the extreme movements of nut F in another direction it will engage with nuts *f f* for the purpose of automatically rotating the flier-sheave to bring the elevator to rest at the extreme upper and lower positions of the cage in the well-known manner.

In this application I do not claim the adjustable sleeve for adjusting the bearing of the worm, neither do I claim the slack-cable mechanism, both of which constitute a part of the elevator mechanism as constructed for use, as shown in the drawings, as the said improvements will form subject-matter of future applications.

While I have shown the various details in the form which I have found excellently adapted for the purpose of my invention in commercial use, I do not restrict myself to the minor details, as they may be modified in various ways without departing from the spirit of the invention.

Having now described my invention, what I claim as new, and desire to secure by Letters Patent, is as follows:

1. In an elevator, the combination of the winding-drum, a drum-shaft, a worm-wheel secured to the drum-shaft, a worm-shaft, fast and loose pulleys on the worm-shaft, belt-shifting bars therefor, two pivoted levers J, J' for moving the belt-shifting bars having cam-surfaces K, a flier-sheave journaled upon the drum-shaft and having a projection $k$ adapted to operate upon the surfaces K of the belt-shifting levers.

2. In an elevator, the combination of the winding-drum, a drum-shaft, a worm-wheel secured to the drum-shaft, a worm-shaft, fast and loose pulleys on the worm-shaft, belt-shifting bars therefor, two pivoted levers J, J' for moving the belt-shifting bars having cam-surfaces K and locking projections L, a flier-sheave journaled upon the drum-shaft and having a projection $k$ adapted to operate upon the cam-surfaces K of the pivoted levers J, J', and a curved locking projection L adapted to engage both of the locking-grooves of the cam-levers J, J' or one of them only when the flier-sheave is shifted whereby one of said levers is locked when the other is being moved, or both are locked when the flier-sheave is in neutral position and the winding-drum at rest.

3. In an elevator, the combination of the winding-drum, a drum-shaft, a worm-wheel secured to the drum-shaft, a worm-shaft, a fast and loose pulley on the drum-shaft, belt-shifting bars therefor, two pivoted levers J, J' for moving the belt-bars having cam-surfaces K and locking projections L, a flier-sheave journaled upon the drum-shaft and having a projection $k$ adapted to operate upon the cam-surfaces K of the pivoted levers J, J', and a curved locking projection L adapted to engage both of the locking-grooves of the cam-levers, or one of them only when the flier-sheave is rotated whereby one of said levers is locked when the other is being moved, or both are locked when the flier-sheave is in neutral position and the winding-drum at rest, and an automatic brake for holding the worm-shaft controlled by a cam upon the flier-sheave to apply the brake when the flier-sheave is in its neutral position.

4. In an elevator, the combination of the winding-drum, a drum-shaft, a worm-wheel secured to the drum-shaft, a worm-shaft, fast and loose pulleys on the worm-shaft, belt-shifting bars therefor, two pivoted levers J, J' for moving the belt-bars having cam-surfaces K, a flier-sheave journaled upon the drum-shaft and having a projection $k$ adapted to operate upon the cam-surfaces K of the pivoted levers, and an automatic brake for holding the worm-shaft controlled by a cam upon the flier-sheave to apply the brake when the flier-sheave is in its neutral position.

5. In an elevator, the combination of a flier-sheave provided with an aperture $m$ in its periphery, a block or plug M fitted to said aperture and prevented from upward movement, and a control-cable wound about the flier-sheave and connected therewith by being made to pass through the aperture of the flier-sheave and around the block or plug.

In testimony of which invention I have hereunto set my hand.

WILLIAM H. HULTGREN.

Witnesses:
WILLIAM HILL,
R. M. KELLY.